(12) United States Patent
Van Baak et al.

(10) Patent No.: US 10,155,201 B2
(45) Date of Patent: Dec. 18, 2018

(54) DISPOSABLE MEMBRANE STACKS

(71) Applicant: Fujifilm Manufacturing Europe B.V., Tilburg (NL)

(72) Inventors: Willem Van Baak, Tilburg (NL); Vinodnarain Bhikhi, Tilburg (NL); Bastiaan Van Berchum, Tilburg (NL); Johannes Van Engelen, Tilburg (NL)

(73) Assignee: Fujifilm Manufacturing Europe B.V. (NL)

( * ) Notice: Subject to any disclaimer, the term of this patent is extended or adjusted under 35 U.S.C. 154(b) by 162 days.

(21) Appl. No.: 15/113,523

(22) PCT Filed: Jan. 23, 2015

(86) PCT No.: PCT/GB2015/050158
§ 371 (c)(1),
(2) Date: Jul. 22, 2016

(87) PCT Pub. No.: WO2015/110829
PCT Pub. Date: Jul. 30, 2015

(65) Prior Publication Data
US 2017/0001146 A1 Jan. 5, 2017

(30) Foreign Application Priority Data

Jan. 27, 2014 (GB) .................................. 1401307.2
Jan. 27, 2014 (GB) .................................. 1401312.2

(51) Int. Cl.
*B01D 61/46* (2006.01)
*B01D 61/50* (2006.01)
(Continued)

(52) U.S. Cl.
CPC ........... *B01D 61/50* (2013.01); *B01D 63/082* (2013.01); *B01D 65/003* (2013.01);
(Continued)

(58) Field of Classification Search
None
See application file for complete search history.

(56) References Cited

U.S. PATENT DOCUMENTS

| 2,741,595 A | 4/1956 | Juda |
| 6,193,869 B1 | 2/2001 | Towe et al. |

(Continued)

FOREIGN PATENT DOCUMENTS

| GB | 1289738 A | 9/1972 |
| JP | H08197060 A | 8/1996 |

(Continued)

OTHER PUBLICATIONS

English Abstract re JPH08197060 dated Aug. 6, 1996.

*Primary Examiner* — Arun S Phasge
(74) *Attorney, Agent, or Firm* — Banner & Witcoff, Ltd.

(57) ABSTRACT

A disposable, crossflow membrane stack suitable for use in an ion exchange unit, the stack comprising alternate dilution compartments and concentration compartments, each compartment being defined by a flat cation-permeable membrane (2) and a flat anion-permeable membrane (1) and at least two edges along which the cation-permeable and an anion-permeable membranes are permanently secured together wherein the cation-permeable membranes and/or the anion-permeable membranes have a textured surface profile which keep said membranes apart and/or from touching each other and wherein the edges secured together define the direction in which liquid may flow through the compartments. Also claimed are ion exchange units comprising the stack, optionally comprising a quick-release securement means to allow facile attachment and release of modular units comprising the stacks.

19 Claims, 3 Drawing Sheets

(51) Int. Cl.
*B01D 63/08* (2006.01)
*B01D 65/00* (2006.01)

(52) U.S. Cl.
CPC ...... *B01D 2313/58* (2013.01); *B01D 2315/16* (2013.01); *B01D 2325/08* (2013.01); *B01D 2325/40* (2013.01)

(56) References Cited

U.S. PATENT DOCUMENTS

| | | |
|---|---|---|
| 2010/0326833 A1 | 12/2010 | Messalem et al. |
| 2011/0290727 A1 | 12/2011 | Van Engelen |
| 2012/0006685 A1 | 1/2012 | Van Engelen |
| 2012/0104993 A1 | 5/2012 | Huang |
| 2012/0117789 A1* | 5/2012 | Liang .................... B01D 61/48 29/592.1 |
| 2013/0017416 A1 | 1/2013 | Goeting et al. |
| 2014/0305863 A1 | 10/2014 | Van Engelen |

FOREIGN PATENT DOCUMENTS

| | | |
|---|---|---|
| WO | 025934 A2 | 1/2002 |
| WO | 2005009596 A1 | 2/2005 |

* cited by examiner

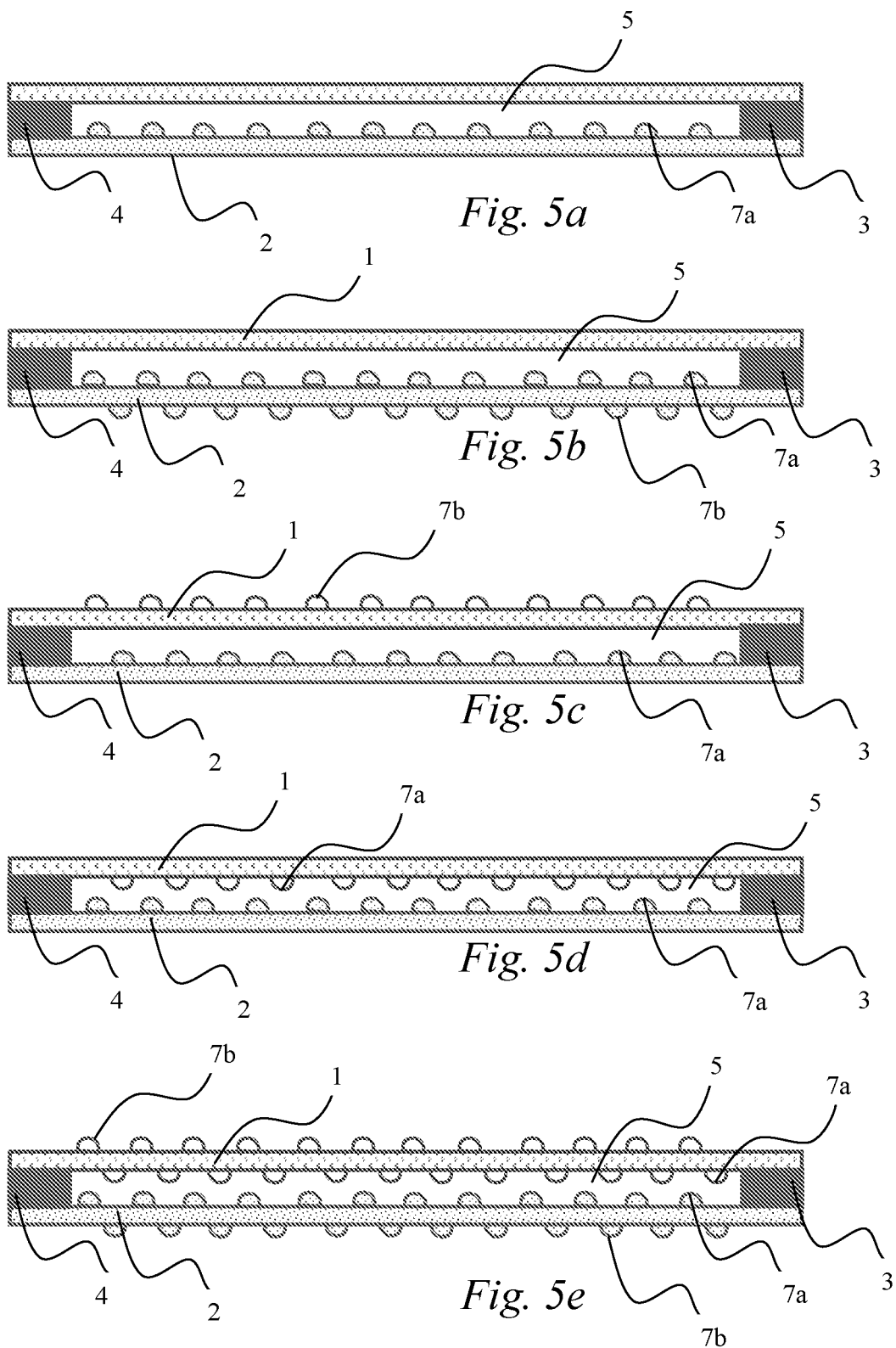

DISPOSABLE MEMBRANE STACKS

RELATED APPLICATIONS

This application is a National Stage Application under 35 U.S.C. 371 of co-pending PCT application PCT/GB2015/050158 designating the United States and filed Jan. 23, 2015; which claims the benefit of GB application number 1401307.2 and filed Jan. 27, 2014 and GB application number 1401312.2 and filed Jan. 27, 2014 each of which are hereby incorporated by reference in their entireties.

The present invention relates to disposable cross-flow membrane stacks and to ion exchange units comprising such stacks.

Ion exchange units ("IEUs") such as reverse electrodialysis units and electrodialysis units are known.

IEUs typically comprise an anode, a cathode and a membrane stack located between the anode and cathode. The membrane stacks comprise alternating dilution compartments and concentration compartments, each compartment comprising a cation-permeable membrane wall and an anion-permeable membrane wall. In reverse electrodialysis ("RED") typically a concentrated ionic solution is fed through the dilution compartment and solution of lower ionic concentration is fed through the concentration compartment. In electrodialysis ("ED") typically an ionic solution is fed through all compartments wherein by applying an electric field ions are forced from the solution in the dilution compartments to the solution in the concentration compartments.

In RED, the concentrated ionic solution is typically sea water or a brine and the solution of lower ionic concentration is typically fresh or brackish water. Electricity may be generated in an environmentally friendly manner from the solute passing through the membranes from the concentrated solution in the dilution compartment to the concentration compartment, this being accompanied by the generation of an output electricity across the electrodes at the ends of the stack. In existing stacks the flow direction through the stacks is usually co-current or counter-current. The voltage generated by the concentration difference across each pair of membranes is low, but this voltage is multiplied by increasing the number of alternating cation and anion exchange membranes that separate the two solutions in the membrane stack.

ED uses similar membrane stacks to those used in RED but in this case electricity is applied across electrodes at each end of the stack in order to remove unwanted ions from an ionic solution. ED may be used, for example, to prepare potable water from salty sea water.

The abovementioned RED and ED techniques both require membrane stacks comprising anion and cation exchange membranes arranged in an alternate manner.

There are two general configurations used for IEUs: first, a plate-and-frame-configuration, and second, a spiral-wound configuration.

IEUs having a plate-and-frame-configuration typically comprise alternate cation-permeable membranes and anion-permeable membranes releasably secured together using end plates bolted together, e.g. as illustrated in FIG. 1. When the membranes become fouled or damaged over time, the end plates may be unbolted and the individual membranes cleaned or replaced as necessary.

The disassembly and reassembly of IEUs of the plate-and-frame-configuration is a laborious and difficult operation. Careful alignment of membranes, spacers and gaskets is required to return the stack to its previous, efficient and leak-free performance. To prevent leakages, high forces are required to tighten IEUs of the plate-and-frame-configuration, e.g. forces of between 10 and 20 Nm or even higher are often required to prevent leakages. These high forces put high demands to the components used to make the plate-and-frame unit such as end plates and bolts, and often cause compression of compartments in the stack and thereby restrict the flow of liquids through the unit.

IEUs employing the spiral-wound configuration typically comprise a cation-permeable membrane, an anion-permeable membrane and spacers wound around a perforated, central tube, as illustrated in FIGS. 2 and 3. Thus the membranes are curved (not flat) with an ever increasing radius as the distance from the central tube increases.

A problem with spiral-wound configuration is that it relies upon a small number (e.g. 2) of very long concentration and dilution compartments. When a blockage occurs in a compartment this can be catastrophic, because the device has so few compartments, significantly reducing or completely disabling the unit. The long compartment length results in a high pressure drop from one end to the other and often thick spacers are required. The manufacture of spiral-wound membranes can also be difficult and the resultant products employing such membranes can be expensive.

We have now devised disposable cross-flow membrane stacks which may be used to prepare IEUs in a rapid and convenient manner. The stacks may easily be packaged and transported. In contrast to conventional plate-and-frame units, the stacks of the present invention may be used to prepare cross-flow IEUs without requiring large compression forces to prevent leakage. Still further, the cation and anion exchange membranes in each stack are already aligned, greatly simplifying the production of IEUs by end users.

According to the present invention there is provided a disposable, crossflow membrane stack suitable for use in an ion exchange unit, the stack comprising alternate dilution compartments and concentration compartments, each compartment being defined by a flat cation-permeable membrane and a flat anion-permeable membrane and at least two edges along which the cation-permeable and anion-permeable membranes are permanently secured together wherein the cation-permeable membranes and/or the anion-permeable membranes have a textured surface profile which keep said membranes apart and/or from touching each other and wherein the edges secured together define the direction in which liquid may flow through the compartments.

In this document (including its claims), the verb "comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one".

The present invention will now be described with reference to the accompanying drawings, in which:

FIGS. 5a to 5e are schematic side views illustrating an embodiment of the present invention using flat, textured membranes.

Figure 1:
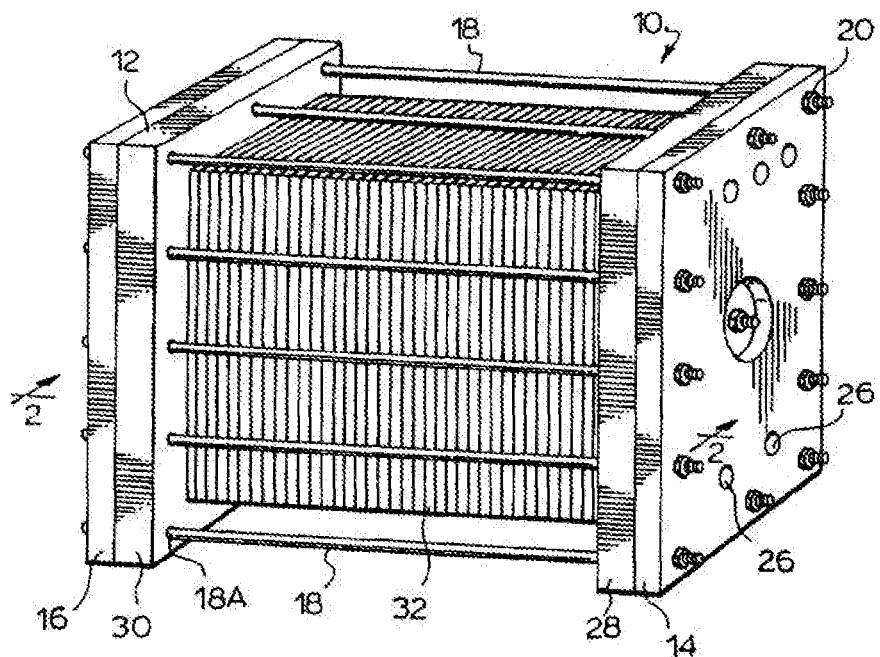
FIG. 1 represents a prior art IEU of plate-and-frame configuration.

FIG. 1 shows a prior art IEU of plate-and-frame-configuration 10. The prior art IEU 10 has a rectangular frame 12. The frame 12 comprises a rigid front plate 14 and a rigid back plate 16 formed of metal. The front plate 14 and the back plate 16 are releasably secured together in a non-permanent manner by a number of tie-bars or bolts 18. Each tie-bar 18 is inserted into a hole 20 located equispaced about the periphery of the front plate 14 and inserted into corresponding holes 18A in back plate 16. A cathode is located proximate the front plate 14 in a cathode compartment and an anode is located proximate the back plate 16 in an anode compartment (not shown). Openings 26 are located in the front plate 14 to allow liquid to enter the IEU 10. Insulating electrode block 28 forming an electrode compartment abuts the perimeter of the front plate 14 and insulating electrode block 30 forming an electrode compartment continuously abuts the perimeter of the back plate 20. The IEU 10 comprises a plurality of alternating cation permeable membranes and anion permeable membranes depicted by numeral 32 between the insulating electrode blocks 28 and 30. The cation permeable membranes and anion permeable membranes 32 define the boundaries of alternating concentration and dilution compartments.

Figure 2:
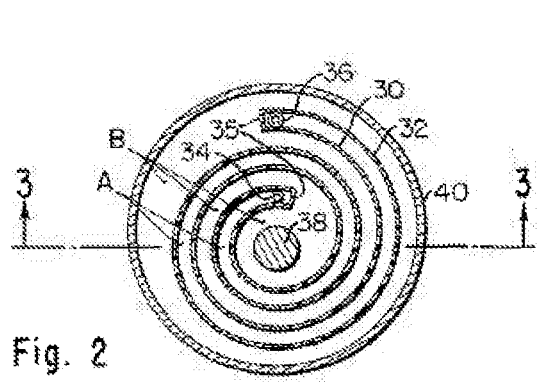
FIGS. 2 and 3 are schematic representations of a prior art electrodialysis IEU of spiral-wound configuration.
Figure 3:
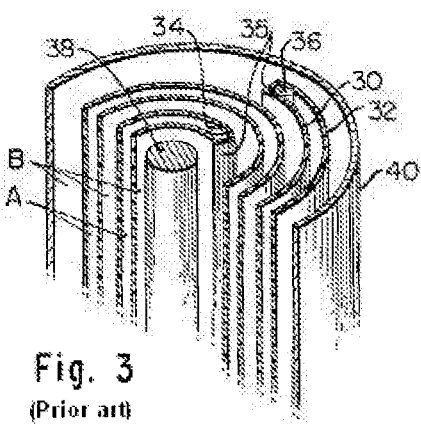

FIGS. 2 and 3 are schematic representations of a prior art electrodialysis IEU of spiral-wound configuration. The IEU comprises one curved cation-permeable membrane 30 and one curved anion-permeable membrane 32 wound in spaced, over-lying turns with each turn of each membrane separated from the adjacent turns of the other membrane so that two compartments A and B are defined, either side of the membranes. An electrical current may be applied by means of electrodes 38 and 40, the former consisting of a rod at the centre of the winding and the latter consisting of a hollow cylindrical member surrounding the winding. A gasket strip 35 situated between the membranes 30 and 32 at their edges encloses compartment A and separates it hydraulically from compartment B. A liquid having a high (or low) ionic concentration may be introduced into and withdrawn from compartment A by means of conduits 34 and 36 situated at the ends of the turns. A liquid having a low (or high) ionic concentration may be introduced into and withdrawn from compartment B, usually in a direction parallel with the electrode 38. The spiral-wound device is configured such that liquids present in compartments A and B cannot mix within the device, but ions can pass through the membrane walls from one of the liquids to the other. In order to maintain a distance between the membranes for the free flow of liquid, grid-like spacer elements are usually provided between the membranes (not shown).

Figure 4:
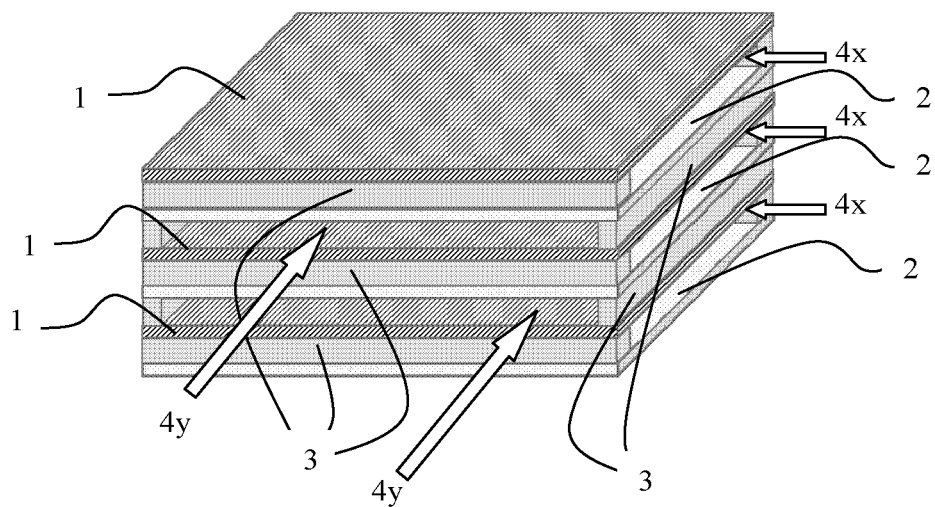
FIG. 4 is a schematic perspective view of a disposable, crossflow membrane stack according to the present invention.

The disposable, crossflow membrane stack of the present invention shown schematically in FIG. 4 comprises three flat anion exchange membranes 1 and three flat cation exchange membranes 2, with each membrane permanently secured to the next along two opposite edges by means of adhesive lines 3 (three at the front, three at the back and two on each side). Each pair of membranes 1 and 2 and the adhesive lines 3 define compartments. The adhesive lines 3 also define the direction in which liquid may flow through the compartments. The arrows 4x and 4y illustrate the direction in which liquid may flow through each of the five compartments shown in FIG. 4. By alternating the position of adhesive lines 3 from one membrane pair to the next, a crossflow arrangement is established in which the liquid passing through the alternate concentration compartments flows in a different direction to liquid passing through the alternate dilution compartments. In the rectangular IEU illustrated in FIG. 4, the direction of flow through each compartment is perpendicular to the direction of flow through the next compartment, creating a crossflow configuration.

FIGS. 5a to 5e better illustrate the compartments 5 defined by a flat cation-permeable membrane 1 and flat anion-permeable membrane 2, permanently secured together along two edges by means of adhesive 3. In FIG. 5a the inner surface of the flat cation exchange membrane 2 has a textured surface profile comprising internal protrusions 7a which can keep the anion exchange membrane 1 and cation exchange membrane 2 apart without the need to include a separate spacer (also called a spacer element) in the compartment. FIG. 5b is similar to FIG. 5a except that both the inner and outer surfaces of the cation exchange membrane 2 have a textured surface profile comprising protrusions 7a and 7b. In the embodiment of FIG. 5b, the inner surface protrusions 7a can keep the anion exchange membrane 1 and cation exchange membrane 2 apart (keeping the illustrated compartment 5 open) and the outer surface protrusions 7b can keep the outer surface of the next compartment (not shown) apart. In FIG. 5c the inner surface of the cation exchange membrane 2 comprises protrusions 7a and the outer surface of anion exchange membrane 1 comprises protrusions 7b. In FIG. 5d the inner surfaces of both the cation exchange membrane 2 and the anion exchange membrane 1 comprise protrusions 7a, thereby increasing the turbulence of liquid as it passes through compartment 5. In FIG. 5e the inner surfaces and outer surfaces of both the cation exchange membrane 2 and the anion exchange membrane 1 comprise protrusions 7a and 7b, thereby increasing the turbulence of liquid as it passes through compartment 5 and increasing the compartment height.

In a preferred embodiment, each compartment comprises two inner walls and two outer walls and at least one of the inner walls (preferably both of the inner walls) and at least one of the outer walls (preferably both of the outer walls) comprises a textured surface profile. This preference is illustrated in FIGS. 5b, 5c and 5e and has the advantage over the embodiments shown in FIGS. 5a and 5d (where the outer walls of the cell lack a textured surface profile) that one may omit spacers from the both the concentration and dilution compartments, thereby simplifying manufacture and reducing the cost of membrane stacks.

The cation-permeable membranes and/or the anion-permeable membranes have a textured surface profile which keep said membranes apart and/or from touching each other, e.g. by creating voids between the membranes through which liquid may pass. In this way one may omit the spacer elements which are usually provided in concentration and dilution compartments in order to keep the membranes apart and ensure that liquid may flow freely through the compartments. As a result one may prepare membrane stacks which are free from spacer elements, or have fewer spacer elements, thereby reducing the overall cost of an IEU.

The use of a textured surface profile to create voids through which liquid may pass, instead of using spacer elements, also has the advantage of reducing fouling, resulting in less down-time and less unit maintenance. A further advantage is that there is a lower pressure drop over the surface of the membrane compared to when conventional spacers are used and thus a lower energy consumption.

One may permanently secure the edges of the anion exchange membrane and cation exchange membrane together by any suitable means, for example by means of an adhesive or a weld.

When the edges are permanently secured together by means of an adhesive, the thickness of the adhesive between the membranes can influence the inter-membrane distance/height of the compartment.

As adhesive one may use a commercially available, non-aqueous adhesive (e.g. an epoxy resin such as 'Araldite') or even double-sided adhesive tape. Typically one will sandwich a line of adhesive between each pair of membranes to be permanently secured together. The line of adhesive may be straight and run parallel to the edge of the membranes, although it may optionally take the form of a wavy line of adhesive.

In a preferred embodiment the adhesive is not electrically or ionically conductive.

The weld is typically a thermal or ultrasonic weld which melts the membranes and, on cooling, permanently bonds the membranes together.

The adhesive or weld is typically water-tight and may be positioned at the very edge of the membranes or at a short distance from the edge.

One may also permanently secure the membranes together by using both an adhesive and a weld, optionally with a spacer located between the membranes near the edges to define the inter membrane distance.

The membranes permanently secured together (e.g. by means of an adhesive or weld) can be contrasted with typical plate-and-frame devices where the membranes, usually present in a frame, are bolted together in a non-permanent way of securing.

In contrast to the curved membranes used in spiral-wound membranes, the membranes used in the present invention are flat/non-curved and may also be described as being substantially planar. The flat membranes optionally have a surface profile and in fact the presence of a surface profile is preferred because the surface profile can be used to help keep the membranes apart when they are in the stack, keeping the compartments open and allowing liquid to pass freely through the compartments. Furthermore, the surface profile can be used instead of including spacer elements in the stack, thereby simplify production of the stacks and reducing their cost. Still further, the surface profile can also reduce energy consumption as mentioned above. The texture of the optionally textured surface profile preferably comprises protrusions. The pattern of the protrusions can be varied widely and may be irregular, although they are preferably regular so as to create a textured membrane having uniform permeation properties across at least 90% of the part of its surface which is or will be in contact with liquid when the stack is being used (thus excluding the part of the surface that is adhered or welded to another membrane). Examples of suitable protrusions and indentations include circular cones, multi-angular pyramids (e.g. triangular pyramidal, square pyramidal and hexagonal pyramidal), hemispheres, mesas (e.g. square, triangular and circular mesas), domes, circular truncated cones, truncated pyramids, diamonds, short ridges, and combinations of two or more thereof.

The extent to which the membrane is textured on a face (i.e. the Texture %) may be expressed by the following equation:

$$\text{Texture \%} = (\text{Area of Texture}/\text{Total Membrane Area}) \times 100\%$$

wherein:
Area of Texture is the area of the membrane which extends outward from the plane of the membrane on the relevant side, measured in the plane of the membrane (e.g. the base area of the protrusions); and
Total Membrane Area is the total effective area the relevant side of the membrane would have if it were not textured (effective means the area that comes into contact with liquid when the membrane is in use, i.e. excluding the area of the membrane which is adhered or welded to another membrane).

The preferred Texture % depends on whether or not the part of the membrane which extends outward from the plane of the membrane (e.g. protrusions) is ionically charged.

When the part of the membrane which extends outward from the plane of the membrane is not ionically charged, the Texture % is preferably low, for example less than 25%, more preferably less than 15%, especially less than 9%, e.g. 7%, 5%, 4% or 2%.

When the part of the membrane which extends outward from the plane of the membrane is ionically charged, which is preferred, the Texture % may be higher because the protrusions typically do not interfere with the ability of the membrane to transport ions. Thus when the part of the membrane which extends outward from the plane of the membrane is ionically charged, the Texture % is preferably 1 to 100%, more preferably 2 to 40%, especially 4 to 30%.

For some embodiments, a low Texture % may be suitable even when the part of the membrane which extends outward from the plane of the membrane is ionically charged, e.g. to reduce fouling. Under these circumstances, the Texture % may be lower than 30%, for example 21 to 29%, or 11 to 18%, or 6 to 9% or even less than 4%.

When the part of the membrane which extends outward from the plane of the membrane is not ionically charged, or where the tips of such extensions are not ionically charged, it is acceptable for a non-ionically charged part of the anion exchange membrane or cation exchange membrane to contact the opposing cation exchange membrane or anion exchange membrane. However, when the parts of the membrane which extends outward from the plane of the membrane are ionically charged throughout their height, it is preferred that the cation exchange membrane and anion exchange membrane do not contact each other.

When the membranes are rather stiff and the protrusions are not ionically charged, or have a tip which is not ionically charged, only a few protrusions are needed to keep the membranes apart. In this case, the Texture % may be very low, e.g. 1.5 to 4% or even below 1%.

In one embodiment the texture of the textured surface profile comprises protrusions which are not ionically charged, or protrusions which have a tip which is not ionically charged, and the average amount of such protrusions is less than 1 per $cm^2$, or alternatively 1.5 to 4 per $cm^2$.

Preferably the part of the membrane which extends outward from the plane of the membrane is ionically charged (i.e. ion conducting) because this avoids the so called 'shadow effect' where the effective surface area of the membrane is reduced. This may even enhance the efficiency of the membranes by enlarging the effective ion-conducting surface area of the membranes relative to the volume of the liquid stream.

Thus a relatively large Texture % may be used when the part of the membrane which extends outward from the plane of the membrane is ionically charged without detrimental effect on the performance of the membrane.

The average distance between the anion exchange membrane and cation exchange membrane (known as the "compartment height", "inter-membrane distance" or "IMD") also has effect on the optimum Texture %. In general, as the IMD increases one may decrease the Texture %. Preferably, when the IMD is 5 to 1000 μm and the part of the membrane which extends outward from the plane of the membrane is ionically charged, the membrane comprises an average of less than 15 protrusions per cm$^2$, more preferably less than 10 protrusions per cm$^2$. For some embodiments a lower number of protrusions may even be desired, e.g. an average of 6 to 9 protrusions per cm$^2$ or even an average of 1.5 to 4 protrusions per cm$^2$.

Preferably the IMD is at most 1 mm, more preferably at most 0.5 mm. The IMD may be determined by measuring the total (average) thickness of the cell at the (secured) edges and subtracting the thickness of the membranes excluding the protrusions, measured as an individual layer, divided by the number of compartments. Preferably the IMD is determined at the edges that are secured together.

Preferably the textured surface profile comprises protrusions which have an average length (L) to average width (W) ratio of 10:1 to 1:10, more preferably 7:1 to 1:7, especially 5:1 to 1:5, more especially 2.5:1 to 1:2.5, when measured at the base of the protrusion. These preferences arise because better convection and lower blockage problems can often be obtained with the aforementioned L to W ratios than when continuous ribs are used where a particle may completely block the passage of liquid between two ribs.

Preferably the textured surface profile comprises protrusions which have an average height (H) of 5 to 500 μm, more preferably 10 to 300 μm. In one embodiment H is 120 to 300 μm, especially when a large IMD is desired, e.g. when the feed stream contains particles that could potentially block a channel having a low IMD.

In another embodiment, H is 55 to 95 μm, or 15 to 45 μm, especially when a small channel is desired, e.g. when the stack is intended for use with a liquid stream having a low ionic content. For streams having a low ionic content, a low IMD is preferred because it reduces the electrical resistance of the stack into which the cell is incorporated.

Preferably H is smaller than L and W. This preference arises because it may reduce membrane swelling and curl when the cell is used.

Preferably H has value which is less than half the value of the IMD.

Preferably the textured surface profile comprises protrusions at least 80% (preferably 100%) of which have a maximum dimension in all directions (length, width and height) of less than 20 mm.

Preferably the textured surface profile comprises protrusions which have a maximum dimension in all directions (length, width and height) of 0.04 to 10 mm, more 0.05 to 6 mm.

Preferably the textured surface profile comprises protrusions which are separated from each other by an average of at least 0.1 mm, more preferably at least 0.5 mm, e.g. by 1, 2, 4, 8, 12 or 20 mm when measured at the base of the protrusion.

The membrane stack preferably has rectangular cross-sectional profiles along two of the x, y and z axes and the cross-sectional profile of an n-sided polygon along the third axis, wherein n is an even integer having a value of at least 4, e.g. 4, 6, 8, 10 or 12. For example, the membrane stack may have a rectangular cross-sectional profile along the x and y axes and a hexagonal cross-sectional profile along the z-axis. Preferably the membrane stack has rectangular cross-sectional profiles along all three of the x, y and z axes, e.g. each of said cross-sectional profiles independently is square or oblong. This can be contrasted to spiral-wound membranes which have a circular cross-sectional profile along one of the x, y and z axes and rectangular cross-sectional profiles along the remaining two axes.

Typically the anion exchange membranes and the cation exchange membranes have substantially the same size and shape. Thus the anion exchange membranes and the cation exchange membranes may be superimposed, one on the other, to give a box-shaped stack.

When the membranes within the stack are rectangular, the length ratio of the longest side to the shortest side of the rectangular membranes is preferably <6:1, more preferably <4:1, e.g. <2:1 or about 1:1.

Preferably the stack comprises more than one concentration compartment and more than one dilution compartment, more preferably at least 20, especially 30 to 1000 concentration compartments and at least 20, especially 30 to 1000 dilution compartments.

The stacks of the present invention having numerous concentration and dilution compartments have an advantage over IEUs of the spiral-wound configuration in that if one compartment becomes blocked, there still remains many other compartments that can continue to operate. Thus the working life of the present stacks can be significantly longer than for IEUs of the spiral-wound configuration, thereby reducing down-time and costs.

According to a second feature of the present invention there is provided an ion exchange unit comprising an anode, a cathode and a disposable cross-flow membrane stack according to the first aspect of the present invention.

The IEU optionally comprises more than one membrane stack according to the present invention, preferably each stack comprising an anode and a cathode.

Anion exchange membranes and cation exchange membranes having a textured surface profile on one or both surfaces can be prepared from membranes lacking a textured surface profile by any one of a number of methods. For example, the textured surface profile may be applied to a membrane lacking a textured surface profile by so-called (embossing) roll-to-roll principle in a single manufacturing line in an efficient and cost effective manner.

In an alternative method, a membrane having a textured surface profile on one or both surfaces may be produced by performing an extrusion process, optionally also performing the abovementioned embossing process. In a further method one may obtain membranes having a textured surface profile by, for example, casting membranes on textured surfaces. In a still further embodiment, one may obtain membranes having a textured surface profile by a process comprising removing a part of the membrane surface, e.g. by laser engraving or plasma etching.

Alternatively, one may apply a textured surface profile to a membrane lacking such a surface profile by a process comprising rotary screen printing, flatbed screen printing, gravure printing, slot-die coating, dispenser printing, inkjet printing, etc. It will be understood that the coating method used depends amongst other things on the coating material used.

According to a third aspect, the present invention provides a process for preparing a disposable crossflow stack according to the first aspect of the present invention, the process comprising permanently securing together opposite edges of flat anion exchange membranes and flat cation exchange membranes, thereby creating alternating dilution compartments and concentration compartments such that the direction in which liquid may flow through the dilution compartments is different to the direction in which liquid may flow through the concentration compartments.

The disposable, cross-flow membrane stack according to the first aspect of the present invention may be provided as modular units which can be included in an IEU in any number. Thus one aspect of the present invention provides an IEU comprising a plurality of modular units, each modular unit comprising a stack according to the first aspect of the present invention. The IEU may be relatively easily assembled, disassembled, expanded and maintained by replacing or adding the modular units as necessary.

Optionally each of the modular units has a cathode and an anode. In the case of an ED unit, the modular units preferably further comprise a means for applying an electrical voltage between the anode and the cathode.

The IEU comprising a plurality of modular units apparatus optionally further comprises a means for passing the liquid which has passed a module into a further module of the unit, for example one or more pipes.

The modular units may be connected in series or in parallel with each other.

Preferably the IEU comprises a quick-release securement means to allow facile attachment of the modular units to the IEU and facile release of the modular units from the IEU.

In a preferred embodiment, the stacks comprise a rigid, compact housing.

According to a fourth aspect of the present invention there is provided a disposable stack or a module according to the present invention and packaging for protection of the stack or a module during transportation, wherein the stack or a module is located inside the packaging.

The packaging may be any packaging suitable for the transportation of the stack or a module via a postal, courier or other delivery service. Typically the packaging is air tight, for example the packaging may comprise a sealed plastic bag or canister which contains the stack or a module.

Although the stacks of the present invention are primarily intended for use in RED or ED, they may also be used for other purposes requiring stacks comprising cationic and anionic membranes, e.g. continuous electrodeionisation (CEDI), capacitive deionisation used in e.g. flow through capacitors (FTC), Donnan or diffusion dialysis (DD) for e.g. fluoride removal or the recovery of acids, pervaporation for dehydration of organic solvents, fuel cells, electrolysis (EL) of water or for chlor-alkali production. All of the foregoing are IEUs.

According to a fifth aspect of the present invention there is provided an ED unit, an RED unit, an electrodeionization module or a diffusion dialysis apparatus, comprising one or more disposable, crossflow membrane stacks according to the first aspect of the present invention. The electrodeionization module is preferably a continuous electrodeionization module.

When the IEU is intended for use in reverse electrodialysis, the IEU preferably comprises an inlet for providing a flow of salty water through the dilution compartment and an inlet for providing a flow of water having a lower solute content through the concentration compartment.

The preferences for the third, fourth and fifth aspect of the invention (e.g. the preferred membranes, seals, surface profile etc.) are as hereinbefore described in relation to the earlier aspects of the present invention.

The invention claimed is:

1. A disposable, crossflow membrane stack suitable for use in an ion exchange unit, the stack comprising alternate dilution compartments and concentration compartments, each compartment being defined by a flat cation-permeable membrane and a flat anion-permeable membrane and at least two edges along which the cation-permeable and an anion-permeable membranes are permanently secured together wherein the cation-permeable membranes and/or the anion-permeable membranes have a textured surface profile which keep said membranes apart and/or from touching each other and wherein the edges secured together define the direction in which liquid may flow through the compartments, wherein the direction in which liquid may flow through the dilution compartments is different to the direction in which liquid may flow through the concentration compartments, wherein the area of texture/total membrane area×100% is 2 to 40%.

2. A stack according to claim 1 wherein the textured surface profile(s) create voids between the membranes through which liquid may pass.

3. A stack according to claim 1 which has rectangular cross-sectional profiles along two of the x, y and z axes and the cross-sectional profile of an n-sided polygon along the third axis, wherein n is an even integer having a value of at least 4.

4. A stack according to claim 1 wherein the cation-permeable and anion-permeable membranes are permanently secured together by means of an adhesive or a weld.

5. A stack according to claim 1 which comprises at least 20 concentration compartments and at least 20 dilution compartments.

6. A stack according to claim 1 wherein each compartment comprises two inner walls and two outer walls and at least one of the inner walls and at least one of the outer walls comprise a textured surface profile.

7. A stack according to claim 1 wherein the textured surface profile comprises protrusions which have an average length to width ratio of 10:1 to 1:10, when measured at the base of the protrusion.

8. A stack according to claim 1 wherein the textured surface profile comprises protrusions having an average height of from 5 to 500 µm.

9. A stack according to claim 1 wherein the average height of the protrusions is smaller than the average length and the average width of the protrusions.

10. An ion exchange unit comprising an anode, a cathode and a disposable cross-flow membrane stack according to claim 1.

11. An ion exchange unit according to claim 10 which comprises a plurality of modular units, each modular unit comprising a disposable cross-flow membrane stack comprising alternate dilution compartments and concentration compartments, each compartment being defined by a flat cation-permeable membrane and a flat anion-permeable membrane and at least two edges along which the cation-permeable and an anion-permeable membranes are permanently secured together wherein the cation-permeable membranes and/or the anion-permeable membranes have a textured surface profile which keep said membranes apart and/or from touching each other and wherein the edges secured together define the direction in which liquid may flow through the compartments, wherein the direction in which liquid may flow through the dilution compartments is different to the direction in which liquid may flow through the concentration compartments.

12. A process for preparing a disposable crossflow membrane stack according to claim 1, the process comprising permanently securing together opposite edges of flat anion exchange membranes and flat cation exchange membranes, thereby creating alternate dilution compartments and concentration compartments such that the direction in which liquid may flow through the dilution compartments is different to the direction in which liquid may flow through the concentration compartments.

13. An electrodialysis unit, a reverse electrodialysis unit, an electrodeionization module, or a diffusion dialysis apparatus, comprising one or more disposable, crossflow membrane stacks according to claim 1.

14. A stack according to claim 1 wherein the direction of flow through each compartment is perpendicular to the direction of flow through the next compartment.

15. A stack according to claim 1 wherein the part of the membrane which extends outward from the plane of the membrane is ionically charged.

16. A stack according to claim 1 which has rectangular cross-sectional profiles along two of the x, y and z axes and the cross-sectional profile of an n-sided polygon along the third axis, wherein:
   (i) n is an even integer having a value of at least 4; and
   (ii) the cation-permeable and anion-permeable membranes are permanently secured together by means of an adhesive or a weld.

17. A stack according to claim 1 wherein:
   (i) the part of the membrane which extends outward from the plane of the membrane is ionically charged;
   (ii) each compartment comprises two inner walls and two outer walls and at least one of the inner walls and at least one of the outer walls comprise a textured surface profile; and
   (iv) the textured surface profile comprises protrusions which have an average length to width ratio of 10:1 to 1:10, when measured at the base of the protrusion.

18. A stack according to claim 1 which has rectangular cross-sectional profiles along two of the x, y and z axes and the cross-sectional profile of an n-sided polygon along the third axis, wherein:
   (i) n is an even integer having a value of at least 4;
   (ii) the cation-permeable and anion-permeable membranes are permanently secured together by means of an adhesive or a weld;
   (iii) the part of the membrane which extends outward from the plane of the membrane is ionically charged;
   (iv) each compartment comprises two inner walls and two outer walls and at least one of the inner walls and at least one of the outer walls comprise a textured surface profile; and
   (vi) the textured surface profile comprises protrusions which have an average length to width ratio of 10:1 to 1:10, when measured at the base of the protrusion.

19. An ion exchange unit comprising an anode, a cathode and a disposable cross-flow membrane stack according to claim 18.

* * * * *